United States Patent
Creech

(10) Patent No.: US 10,632,574 B1
(45) Date of Patent: Apr. 28, 2020

(54) METHOD OF MANUFACTURING IMAGES ON METAL WITH TIGHT BENDS

(71) Applicant: Joseph Bryan Creech, Louisville, TN (US)

(72) Inventor: Joseph Bryan Creech, Louisville, TN (US)

(*) Notice: Subject to any disclaimer, the term of this patent is extended or adjusted under 35 U.S.C. 154(b) by 118 days.

(21) Appl. No.: 16/123,670

(22) Filed: Sep. 6, 2018

Related U.S. Application Data

(60) Provisional application No. 62/554,801, filed on Sep. 6, 2017.

(51) Int. Cl.
| | |
|---|---|
| *B23P 17/04* | (2006.01) |
| *B21D 5/00* | (2006.01) |
| *B41M 1/28* | (2006.01) |
| *B41M 5/03* | (2006.01) |
| *B41M 5/035* | (2006.01) |

(52) U.S. Cl.
CPC .............. *B23P 17/04* (2013.01); *B21D 5/008* (2013.01); *B41M 1/28* (2013.01); *B41M 5/035* (2013.01)

(58) Field of Classification Search
CPC .......... B23P 17/04; B21D 5/008; B41M 1/28; B41M 5/035
See application file for complete search history.

(56) References Cited

U.S. PATENT DOCUMENTS

| | | | | |
|---|---|---|---|---|
| 5,669,972 A | * | 9/1997 | Cox | B41C 1/14 118/504 |
| 5,807,610 A | * | 9/1998 | Cox | H05K 3/1225 427/256 |
| 6,698,345 B2 | * | 3/2004 | Cutcher | B41F 15/0895 101/123 |
| 6,834,582 B2 | * | 12/2004 | Cutcher | B41F 15/0895 101/123 |
| 2002/0007740 A1 | * | 1/2002 | Cutcher | B41F 15/0895 101/123 |
| 2004/0187713 A1 | * | 9/2004 | Cutcher | B41F 15/0895 101/35 |

* cited by examiner

*Primary Examiner* — Bayan Salone
(74) *Attorney, Agent, or Firm* — Stephen J. Stark; Miller & Martin PLLC

(57) ABSTRACT

A method of manufacturing printed images on metal with tight bends provides for crack free edges at the tight bends, something previously unattainable in the marketplace. Specifically, prior to bending the metal, the at least coated metal (if not dye sublimated printed) is at an elevated temperature in a range of 90 to 250 degrees Fahrenheit, such as in a range of 190-200 degrees. The metal is then bent which has been found to permit self-leveling of the coating throughout the tight bend, as opposed to it being so narrow that cracking occurs.

20 Claims, 6 Drawing Sheets

US 10,632,574 B1

METHOD OF MANUFACTURING IMAGES ON METAL WITH TIGHT BENDS

CLAIM OF PRIORITY

This application claims the benefit of U.S. Provisional Patent Application 62/554,801 filed Sep. 6, 2017 which is incorporated herein by reference in its entirety.

FIELD OF THE INVENTION

The present invention relates to a method of manufacturing images on metal backing with at least small radius bends, if not sharp angles, and more particularly a method involving the transfer of an image to a piece of metal and then bending the metal to a desired shape of one of a small radius bend and an angle without degrading the image along the bends, such as to provide a simulated canvas.

BACKGROUND OF THE INVENTION

For many years the applicant has been selling metal to the photography industry for metal to have photographs transferred thereon. While wide arcs and large radius (>2 cm) bends have been performed with the prior art, the applicant and others have been unable to provide a small radius bend (<1 cm) at corners such as a substantially 90-degree angle as is normally provided in a canvas-style backing after printing the metal while keeping the paint from cracking and peeling away at the corners to provide a defective product. The prior art image would normally crack at the bent edges and then start the process of the image peeling away from the metal to provide a defective product. In spite of many different attempts over the past few years to create a suitable product, the applicant has been unable to do so until now.

A large radius bend is defined herein as having a radius of curvature exceeding two centimeters. A small radius bend is defined herein as having a radius of curvature not exceeding one centimeter. A tight bend is one of a small radius bend and an angle.

SUMMARY OF THE INVENTION

It is an object of many of the embodiments of the present invention to provide an improved method of manufacturing canvas-style and other style metal backings for use with photographs or other images that have tight bends therein wherein the image continues across the small radius bend (or angle) in an uninterrupted manner without paint degradation to the point of failure at the bend.

It is another object of many of the embodiments of the present invention to provide an improved method of providing metal image backings which can be bent at sharp angles in addition to sharp radius bends while maintaining the integrity of the image layer without cracking at the bends.

Accordingly, in accordance with a presently preferred embodiment of the present invention, the applicant is providing a method of printing photography images and/or other images onto aluminum or other metal. After printing the image onto the metal, the metal is then bent with at least a small radius bend such as less than a centimeter if not less than 5 millimeters if not even less than one millimeter radius up to and including hard angles at least up to 90 degrees if not up to almost 180 degrees.

By providing the aluminum or metal blank in a desired shape and then printing the image thereon, such as with dye sublimation and/or wide format printing as or on a layer, the printed blank can then be bent to a desired shape either, after the dye supplementation method (or before) at an elevated temperature exceeding at least 100 degrees (Fahrenheit), if not in the range of about 100 degrees to about 210 degrees, such as 190 degrees, to then perform the bending such as with a brake to a desired shape. Some embodiments may be thin enough at the bend to bend without a brake. Furthermore, thinner materials can, for at least some embodiments, be bent at lower temperatures than thicker materials.

Bonding at over 250 degrees Fahrenheit can melt or degrade the image. By selecting the material utilized as it relates to the metal, the thickness of the metal, particularly at the bend, the temperature to start the bending process, the coating applied to the metal, the ink and/or other factors, the applicant has been able to repeatedly maintain the integrity of the printed layer at the bends (without cracking or peeling) and angles thereby permitting the applicant to not only be able to make canvas looking backed prints which have a front rectangular face with four edges bent at 90% angles with small bends thereto and then another set of small bends as 90% to the sides to form a back lip from strips. The strips can respectively have perforations therethrough for use in attaching to a wall.

The applicant uses a polyester coating which can have UV resistant characteristics along with water based ink delivered through a dye sublimation process whereby an image is first printed on paper and then the paper is heated and pressed against the metal whereby the heat effectively turns the printed ink into gas and releases from the paper to then attach to the metal through the coating. Dye sublimation is well known in the art. In addition to dye sublimation it is also be possible to utilize a flat bed printer. Other embodiments may utilize other printing techniques. Some embodiments contemplate bending before printing, others printing before bending.

It is believed to be unique in the art to be able to obtain angles and small radius bends achieved by the applicant's process without damaging the image in the process.

BRIEF DESCRIPTION OF THE DRAWINGS

The accompanying drawings illustrate the preferred embodiments of the invention and, together with the description, serve to explain the invention. These drawings are offered by way of illustration and not by way of limitation.

DETAILED DESCRIPTION OF THE PREFERRED EMBODIMENT

Figure 1:
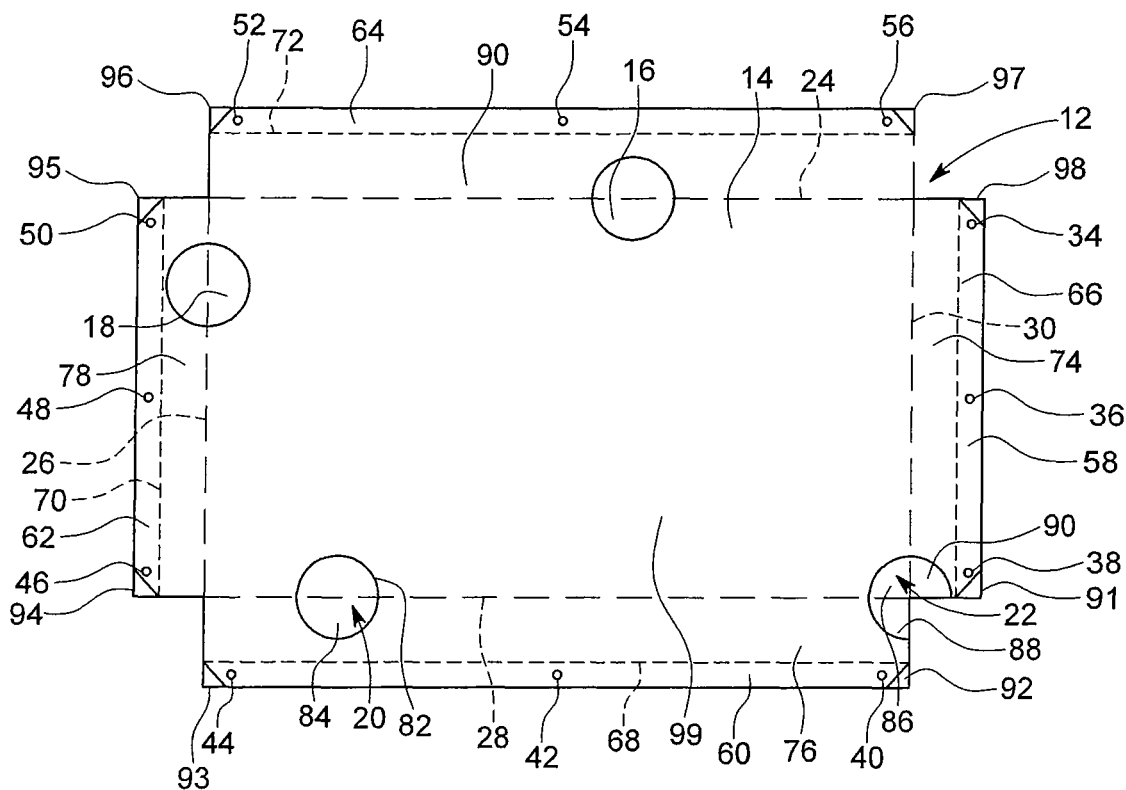
FIG. 1 is a top plan view of a metal blank after cutting and printing in accordance with a presently preferred embodiment of the present invention.

FIG. 1 shows a metal blank 12 printed with an image 14 thereon by way of representation only. Circular portions 16,18,20,22 are illustrated because these image portions extend over first, second, third and fourth edges 24,26,28,30 when the blank 12 is bent to a desired shape as will be discussed below. The image portions 16-22 are provided for illustrative purpose only and in no way are all images limited to circles. It is likely that many images 14 could be landscape photographs, people and/or other images or even logos, graphic art and/or other printed images as provided onto blank 12.

Figure 2:
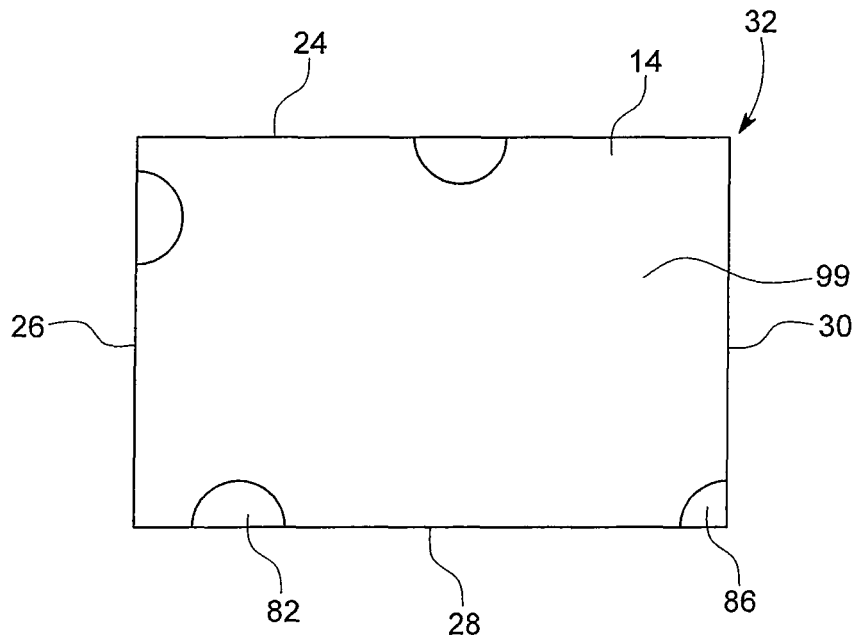
FIG. 2 is a top plan view of the blank of FIG. 1 after being bent into a desired shape.
Figure 3:
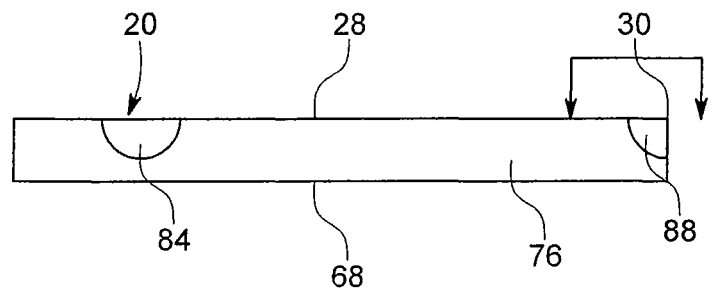
FIG. 3 is a side plan view of the embodiment of FIG. 2.

As can be seen in reference to FIG. 2, the image 14 on the blank 12 of FIG. 1 where the image 14 has been bent with tight bends provides a canvas-style backing 32 in which the first, second, third and fourth edges 24,26,28,30 are viewable from a top view as shown in FIG. 2 with front face 99 which could normally be the front as could be seen when the backing 32 is mounted to a wall as will be discussed in further detail below.

Figure 7:
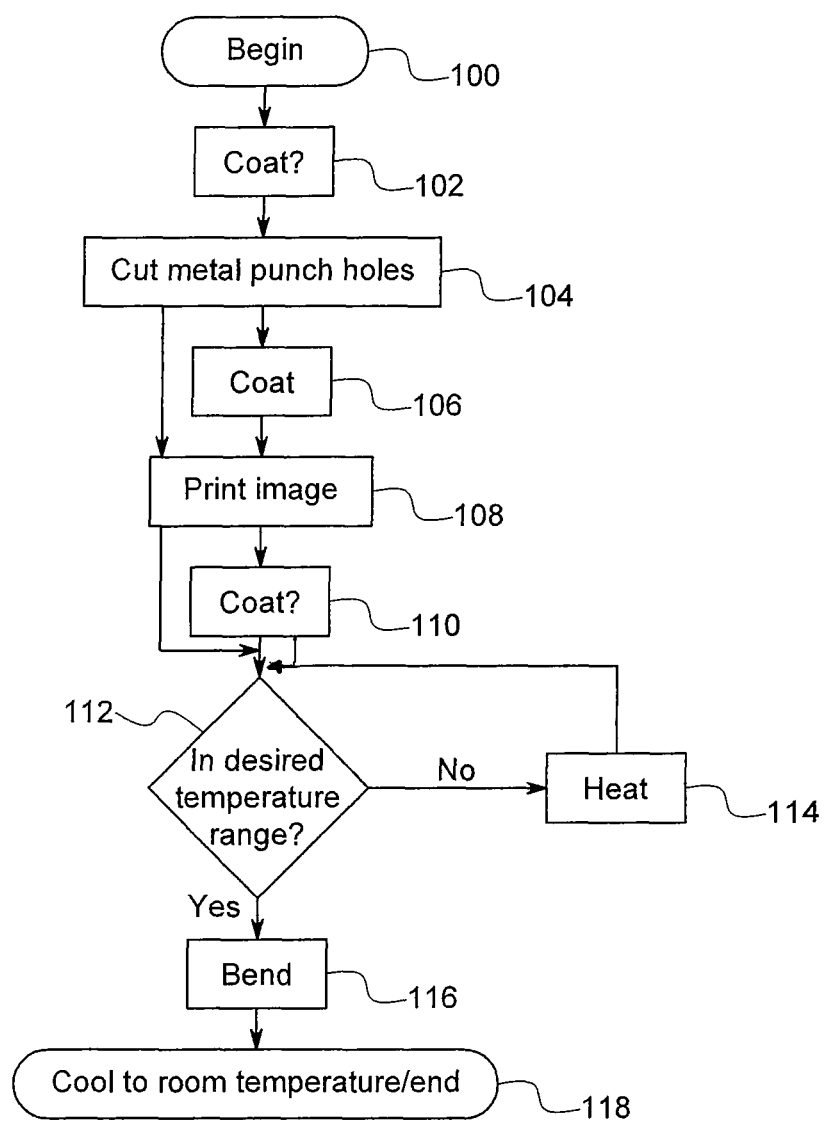
FIG. 7 is a flow chart of the method of the present preferred embodiment of the present invention.

The process of FIG. 7 can be utilized to manufacture the canvas-style backing 32 shown in FIG. 2 or other shapes. Specifically, the process beings at step 100. A metal coil, sheet metal, or other metal may be coated at step 102 if it is not provided as a pre-coat, if a coating at all is provided. Next the metal may be cut into desired shapes such as the shape shown in FIG. 1 and step 104 possibly with holes such as holes 34,36,38,40,42,44,46,48,50, 52,54,56. Of course, other numbers and/or locations of holes could be 34-56 of other embodiments. These holes 34-56 are shown on strips 58,60,62,64 which will preferably be bent with tight bends along rear edges 66,68,70,72 relative to sides 74,76,78,80 as will be discussed in further detail below.

Meanwhile after punching the holes 34-56 in step 104 if not already coated, the blank 12 can be coated at step 106. An image 14 can then be printed at step 108 either through the dye sublimation method and/or with various printers as is done in the marketplace. Dye sublimation often occurs at temperatures at or above 370 degrees Fahrenheit or even 400 degrees Fahrenheit, but bending at that temperature as described herein creates defective print at the bends. The printed blank 12 may then be coated at step 110 or not after the image is printed depending on the technique utilized. At this point, before bending at step 116, the desired temperature or range of at least a minimum temperature, and preferably within a temperature range, as provided at step 112 before bending the metal at step 116 such as with a brake or other appropriate bending device, possibly even without heavy equipment as described below. For many embodiments, when utilizing a coating of polyester, particularly with the dye sublimation method, a temperature of at least 100 (or possibly even 90 or 95 degrees Fahrenheit for some embodiments) if not 120 degrees Fahrenheit is desired before bending in step 116. With the dye sublimation procedure, it is possible for the temperature to be at approximately 370 degrees Fahrenheit when applying the image 14 to the blank 12. Bending could occur at step 116 when in the desired range (such as between about 120-250 degrees Fahrenheit) as the blank 12 cools. Some brakes may assist in cooling (or heating) the blank 12 rather rapidly due to a metal on metal contact. In fact, for some embodiments, the tooling is heated and room temperature blanks 12 are inserted and bent at the heating/bending steps. It might be possible that a separate heating step 114 may need not for such embodiment, but could be provided depending on the timing of when the bending 116 is provided. Heating could be applied to the blank 12 and/or to the tooling such as to the brake (possibly by inserting a blank 12 at room temperature). Bending at too high of temperature often can leave marks on the image from tooling. Heating up to, or after cooling down the blank 12 to 190, 195 or 200 degrees Fahrenheit can work well for many embodiments putting in room temperature tooling.

Of course, it may be that the image 14 is allowed to cool to room temperature. Then a heating step 114 is desirable before bending 116 as would be understood by those of ordinary skill in the art. As a result of the bending processing or afterwards at step 118, the backing 32 such as a canvas-style frame returns to room temperature and the process ends so that the product could then be shipped to a customer. Referring back to FIG. 1, the strips 56,60,62,64 with the holes 34-56 punched therethrough are preferably bent during the bending step relative to the sides 74-76,78,80 with brakes or other bending devices with tight bends. Additionally, possibly after performing this step, the blank 12 with one or more images such as images 20,22 which have image portions 82,84 for image 20 and 86,88,90 for image 22 are preferably bent with tight bends at edges 28,30 as well as 26,24 so that across those edges 28,30 and other edges as illustrated, the images 20,22 remain continuous without defects along the edges, 20,22 whether those are sharp angle edges and/or small radius bends (i.e., tight bends) wherein the small radius bend is defined as having a radius of less an 1 centimeter if not less than 5 millimeters if not less than 1 millimeter such as with commonly occur in canvas-style prints.

With the prior art, bending techniques result in defects which typically arise with radius bends below 2 centimeters in radius. Accordingly, as a result thereof, no manufacturer is known to apply canvas-style print such as is shown in FIGS. 2-6 in the marketplace which would provide 90 degree angles or narrow (i.e., small) radius bends.

Figure 6A:
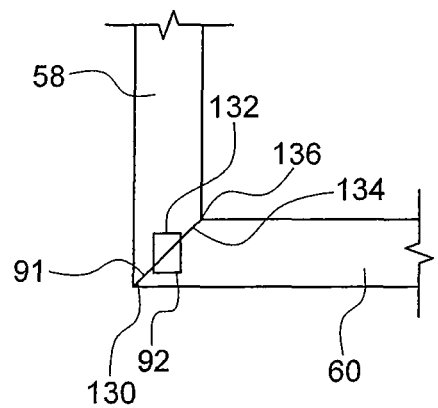
FIG. 6A is a plan view of detail B shown in FIG. 5.
Figure 6B:
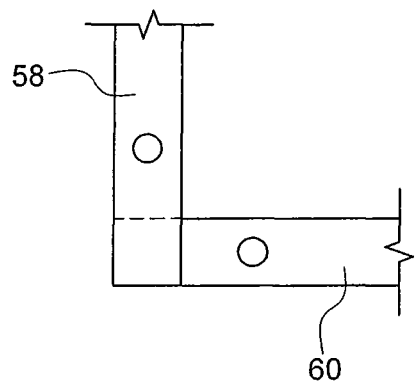
FIG. 6B is a plan view of an alternative embodiment of detail B shown in FIG. 5.

Also, when forming the blank 12 as shown in FIG. 1, it is possible to cut the corners 91-98 from the strips 58-64 so that when the strips 58-64 meet, such as is shown in FIG. 6A, various connections can be provided as is shown in FIGS. 6A and 6B. Specifically, the corners 93,94 may be welded with a weld 130, connected with adhesive 132, such as the type illustrated or other image, meet at adjacent corners 91,93 in a contacting manner 134, and/or gapped 136 such as shown in FIG. 6A with any of those four possibilities and/or others are a possible at the meeting of corners 91,92 of strips 58,60 as would be understood by those of ordinary skill in the art. It may also be possible not to provide the cutouts 91,92 and the others, so that the strips 58,60 overlap as illustrated or possibly with strip 58 overlapping 60 as illustrated in the embodiment (or vice versa).

Many embodiments have the holes 34-56 so that there are locations where the user can attach a wire hanger and/or connect to nails or other connectors on a vertical wall.

Figure 4A:
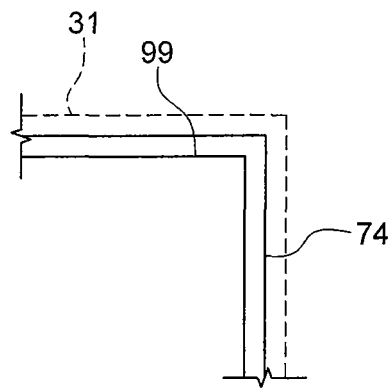
FIG. 4A is a cross-section detail A-A taken from FIG. 3.
Figure 4B:
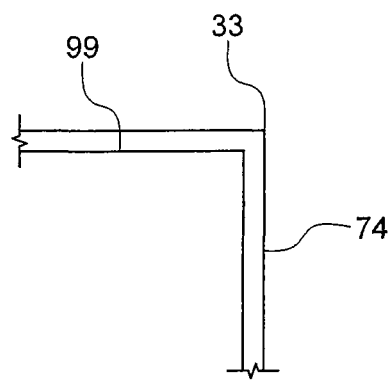
FIG. 4B is a first alternative cross-section detail taken along line A-A in FIG. 3.
Figure 5:
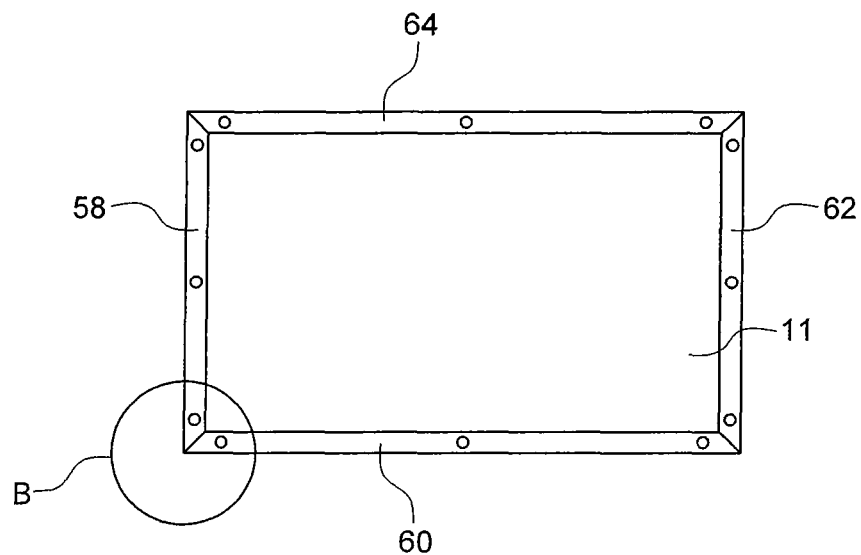
FIG. 5 is a rear plan view of the embodiment of FIG. 1.

FIGS. 4A and 4B show the cross section along edge 30 which may take the form of a rounded edge 31 or a sharp corner 33 as is shown with reference to FIGS. 4A and 4B as relates to the location of a side 74 to a top face 99. The construction of these small radius bend 31 and/or sharp angles 33 as has been discussed above, and could range as it relates to a sharp edge curve from about 15 to 30 degrees to up to 150-165 degrees or for a sharp angle anywhere from about 5 degrees to about 180 degrees. 90 degrees between the top face 99 and the side 74 is illustrated. This is the construction of the canvas-style backing 32 as shown in FIG. 2. Other backings may have other angular relationships.

This technology is not intended to cover very large radius bends such as those including a radius of a foot or two which can be done with the prior art technology. However, without the methodology as shown and described herein, attempting to utilize that methodology with a small radius bend, such as less than about 1 centimeter will result in cracking and/or peeling at any of the edges 24-30. The printed layer will likely narrow at the bend during the bending step, but the heating process can maintain its integrity (i.e., keep it from cracking and/or peeling). The image at the edges 24-30 will likely be slightly distorted since the printed layer will likely be at least slightly thinner at least along portions of the bend, but the distortion is normally not noticeable for many embodiments.

Although aluminum is the preferred metal for the blank 12, any metal that may be bent utilizing traditional bending technology or otherwise could be utilized with the process shown and described herein. Furthermore, depending on the specific batch of metal, ink or coating utilized, the desired temperature range at step 112 may be effected. For instance, some blends of metal may be softer than others and some blends may be harder. Thinner metals may often be bent at lower temperatures than thicker metals. Scoring, or providing narrower portions at bends can also potentially reduce temperature needed to provide non-defective images. Accordingly, it may be necessary to heat some blends to a higher temperature than others in order to perform the bending step 116 so as not to provide a defective image along any of the edges 24,26,28,30.

Furthermore, although a 16×24 print face 99 is shown with sides 74,76,78,80 having a width of approximately 1½ inch and strips 5,60,62,64 of about ½ inch, other dimensions may be provided with other embodiments.

Additionally, the coating as coated in any steps 102,106, 110 or others, is preferably a polyester coating and the ink utilized for printing could preferably be a water based ink and could be printed with dye sublimation method and/or a flat-bed printer (or other printer) and other techniques and/or inks and coatings may be utilized with other processes.

When making the blank 12, it may be possible to die cut the blank 12. It may also be possible to cut with a waterjet, a plasma cutter, a laser cutter or other cutters and/or die stamping as are known in the marketplace.

Furthermore, the heating step may be performed with various heating technologies whether it be a heat gun, a press, an oven, a heating plate and/or other device capable of elevating the temperature of the plate 12 prior to bending step 116 if necessary. Remember for the dye sublimation method it may be possible to bend at step 116 after the printing step 108 without a separate heating step 114 because it may be possible that the temperature is in the desired temperature range at step 112 as it comes out of the printer step at step 108.

Figure 8A:
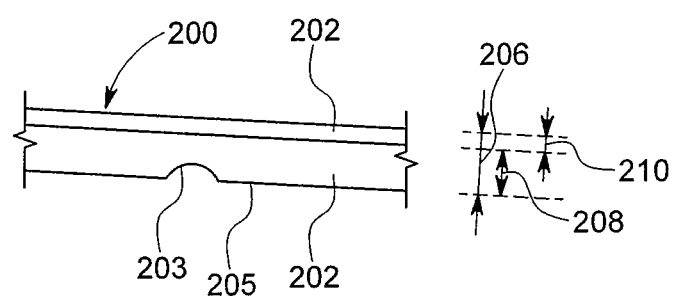
FIG. 8A is a second alternative embodiment showing cross-sectional detail of A-A from FIG. 3 before bending.
Figure 8B:
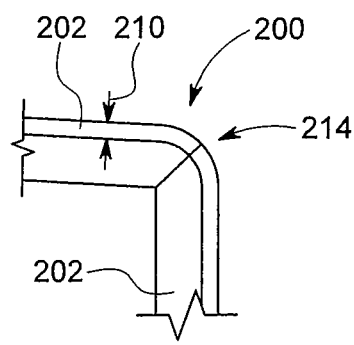
FIG. 8B is the second alternative embodiment of FIG. 8A taken along the line A-A of FIG. 3.

FIGS. 8A and 8B show alternative embodiment of a bend shown as an edge 200 before and after bending. The material forming blank 202 may be thinner and/or be provided with a score, groove, slot, depression or other narrower portion 203 on an opposite face 204 of the edge 200. In fact, for some embodiments, the narrower portion 203 can permit one to form the edge 200 by hand (i.e. without expensive tooling) such as at about 100 degrees Fahrenheit under optimal conditions. A corner made of two edges 200 can possibly then be taped or at least connected, for at least some embodiments.

For instance, a 032 aluminum product could be scored or otherwise provide a narrower portion 203 of the blank 202 than adjacent portion 205, such as up to, or even exceeding 10% narrower than an adjacent thickness of the blank 202 as represented by thicknesses 206 and 208. Bending by hand and/or with hand tools is then quite feasible to repeatedly produce a quality product. If the narrower portion 203 were 15, 20, 25, or 50 percent, bending would likely be easier still. A thickness 210 of the printed layer 212 is most likely thinner at the bend represented by bend thickness 214 after bending which could distort the image at that location, at least slightly, but be difficult to discern since the distortion is normally small and occurs at an edge 24-30. Also, by providing a narrower portion 203 at the bend 200 (on the opposite side as shown in FIGS. 8A and 8B), tighter bends 200, such as even around ¹⁄₆₄-inch radius could be provided. Certainly, other small radius bends between ¹⁄₆₄-inch and 1-inch could be provided including ¹⁄₃₂-inch, ¹⁄₁₆-inch, ⅛-inch, ¼-inch or ½- inch or other dimension radius could be provided.

Figure 9:
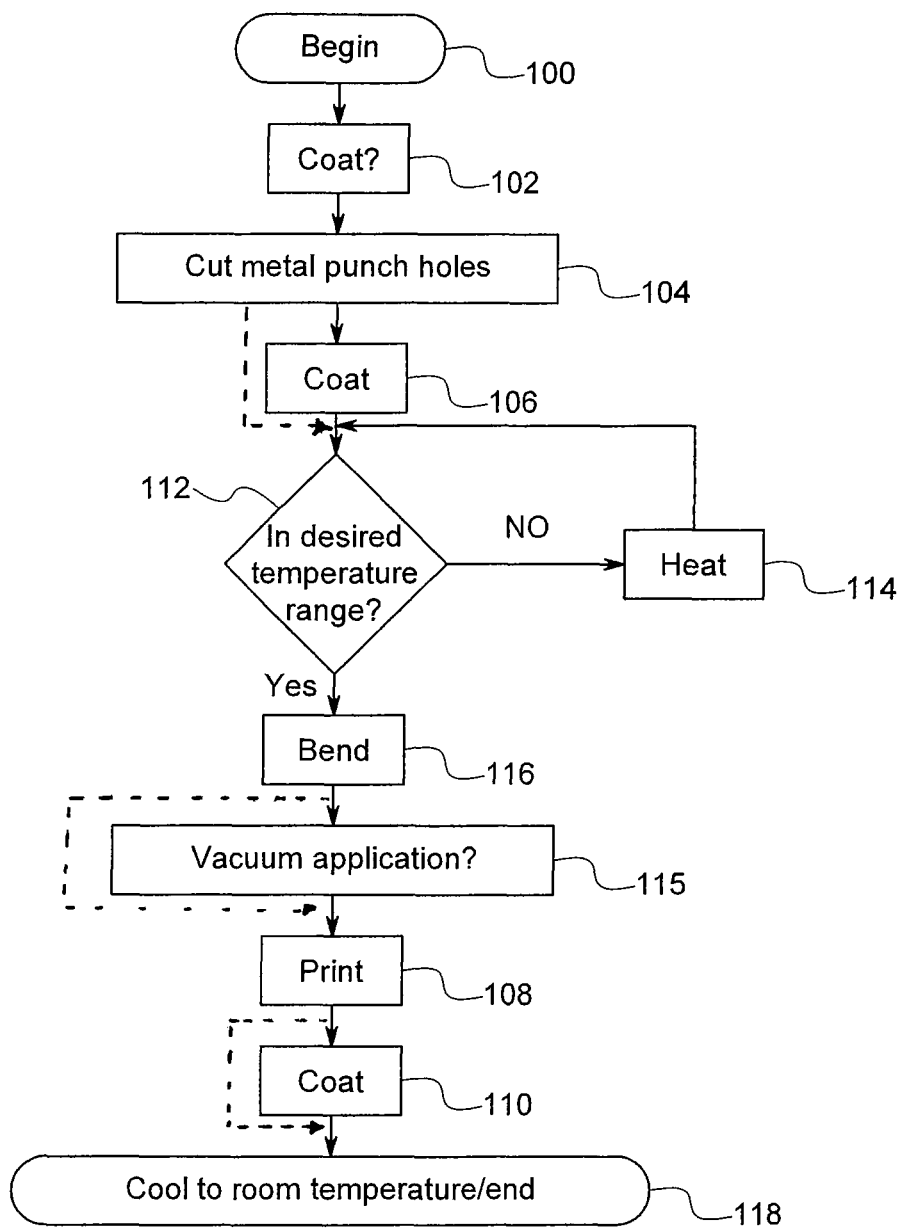
FIG. 9 is a flow chart of the method of an alternatively preferred embodiment of the present invention.

FIG. 9 shows a flow chart 200 of an alternatively preferred embodiment which, once again, begins at the beginning 100 and provide an optional coating step at step 102. Dye sublimation may be performed as illustrated in the flow chart 200. Dye sublimation normally occurs at a temperature of about 370-400 degrees Fahrenheit, but bending at that temperature causes point failure at the bend as described herein. Cutting of the metal and/or punching holes step may occur at step 104. Coating at step 102 and/or 106 may occur either before and/or after cutting the metal, if at all at this time, or the punching hole step at step 104. The temperature then can be evaluated at step 112. If the temperature is within a desired range than bending can occur at step 116 as a tight bend. If not, heating can occur at step 114 to achieve a desired temperature range and then bend at step 116.

Then a printed image may be applied at step 108 possibly after an optional vacuum step 115 of applying a transfer to the blank and then possibly, if at all, a post coating step at step 110 could possibly occur after printing at step 108. The product can then be allowed to cool to room temperature and ending the process at step 118.

Once again, pre-coated blanks may be heated into the specific temperature range as described above to prevent the pre-coat to not later provide a cracked image after printing through this alternatively preferred embodiment. If the pre-coated blank is not within the desired temperature range as described above while bending, then cracking has been found to occur after printing on a tight bend as described herein utilizing prior art techniques.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of manufacturing printed images on metal with tight bends comprising the steps of:
   a) printing an image on a metal backing;
   b) while at a temperature in a range of 100 degrees Fahrenheit and 210 degrees Fahrenheit, bending a printed portion of the metal backing in a tight bend of at least 5 degrees and a radius of curvature of less than one centimeter to a desired shape; and c) then, allowing the desired shape to cool to room temperature without the printed portion cracking at the tight bend.

2. The method of claim 1 further comprising the step of at least one of drilling and cutting to the metal backing to a desired shape as a blank before the printing step.

3. The method of claim 2 further comprising the step of coating the metal backing before the printing step.

4. The method of claim 1 further comprising the step of coating the metal backing before the printing step.

5. The method of claim 1 wherein the bending step further comprises at least four tight bends bent perpendicularly to one another to provide a canvas style backing with a front face substantially perpendicular to four sides.

6. The method of claim 5 wherein the bending step further comprises at least eight tight bends with four tight bends extending from the sides into strips, said strips substantially parallel to a front face.

7. The method of claim 6 further comprising the step of connecting adjacent strips together.

8. The method of claim 1 wherein the blank is cut from one of metal coil and sheet metal in the cutting step.

9. The method of claim 1 further comprising the step of coating the metal backing before printing and the printing step further comprises a dye sublimation application of the image.

10. The method of claim 1 wherein the bending step further comprises bending with a brake.

11. The method of claim 1 wherein the bending step is performed at a narrower portion of the metal backing, with the narrower portion having a width at least 10% narrower than surrounding portions.

12. The method of claim 11 wherein the narrower portion has a width at least 20% narrower than surrounding portions.

13. The method of claim 11 wherein the bending step further comprises at least four tight bends bent perpendicularly to one another to provide a canvas style backing with a front face substantially perpendicular to four sides, and one of (a) the sides bent with tight bends to provide strips parallel to the front face whereby adjacent strips are then connected together, and (b) adjacent sides are connected together at corners.

14. The method of claim 1 wherein the bending step occurs in a temperature range between 120 and 250 degrees Fahrenheit.

15. The method of claim 1 wherein the tight bend has a curvature between 30 and 180 degrees.

16. The method of claim 15 wherein the tight bend has a radius of curvature of less than ⅛ inch.

17. The method of claim 1 wherein the bending step occurs after heating the metal backing up to a temperature of between about 190 and 200 degrees Fahrenheit.

18. The method of claim 1 wherein step of printing is performed one of (a) before and (b) after the bending step.

19. A method of manufacturing printed images on metal with tight bends comprising the steps of:
a) printing an image on a coated portion of a metal backing;
b) while at a temperature in a range of 90 degrees Fahrenheit and 210 degrees Fahrenheit, bending a coated portion of the metal backing in a tight bend of at least 20 degrees and a radius of curvature of less than one centimeter to a desired shape; and
c) allowing the desired shape to cool to room temperature without the printed portion cracking at the tight bend.

20. The method of claim 19 wherein step of printing is performed one of (a) before and (b) after the bending step.

* * * * *